(12) United States Patent
Kubotera et al.

(10) Patent No.: US 7,701,676 B2
(45) Date of Patent: Apr. 20, 2010

(54) FLYING HEAD SLIDER AND RECORDING MEDIUM DRIVE

(75) Inventors: Hiroyuki Kubotera, Kawasaki (JP); Takahiro Imamura, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 384 days.

(21) Appl. No.: 11/416,101

(22) Filed: May 3, 2006

(65) Prior Publication Data

US 2007/0177306 A1 Aug. 2, 2007

(30) Foreign Application Priority Data

Jan. 31, 2006 (JP) .............................. 2006-023168

(51) Int. Cl.
*G11B 5/56* (2006.01)

(52) U.S. Cl. .............................. 360/294.7; 360/125.31; 360/125.74

(58) Field of Classification Search .............. 360/234.5, 360/59, 234.4, 128, 294.7, 125.31, 125.74; 219/506
See application file for complete search history.

(56) References Cited

U.S. PATENT DOCUMENTS

| | | | |
|---|---|---|---|
| 6,963,464 B2 | 11/2005 | Xu et al. | |
| 6,992,850 B2 | 1/2006 | Nishiyama | |
| 7,102,856 B2 * | 9/2006 | Koide et al. | 360/234.5 |
| 7,113,369 B2 * | 9/2006 | Ota et al. | 360/234.5 |
| 7,224,553 B2 | 5/2007 | Sasaki et al. | |
| 7,291,814 B2 * | 11/2007 | Oishi et al. | 219/506 |
| 7,362,544 B2 * | 4/2008 | Shiramatsu et al. | 360/234.5 |
| 7,400,473 B1 * | 7/2008 | Krajnovich et al. | 360/294.7 |
| 7,474,504 B2 | 1/2009 | Xu et al. | |
| 2002/0191326 A1 | 12/2002 | Xu et al. | |
| 2003/0099054 A1 * | 5/2003 | Kamijima | 360/59 |
| 2005/0030666 A1 | 2/2005 | Sasaki et al. | |
| 2005/0213250 A1 * | 9/2005 | Kurita et al. | 360/234.4 |
| 2006/0039077 A1 | 2/2006 | Xu et al. | |
| 2006/0187583 A1 * | 8/2006 | Lou et al. | 360/128 |
| 2008/0192379 A1 * | 8/2008 | Kurita et al. | 360/75 |

FOREIGN PATENT DOCUMENTS

| | | |
|---|---|---|
| JP | 5-20635 | 1/1993 |
| JP | 2004-259323 | 9/2004 |
| JP | 2005-056509 | 3/2005 |
| JP | 2005-135501 | 5/2005 |
| WO | 02/37480 | 5/2002 |

* cited by examiner

*Primary Examiner*—Angel A. Castro
(74) *Attorney, Agent, or Firm*—Greer, Burns & Crain, Ltd.

(57) ABSTRACT

A flying head slider includes a write head element and a read head element mounted on the slider body. A first transformable actuator serves to protrude the write head element toward a recording medium. A second transformable actuator serves to protrude the read head element toward the recording medium. The first and second transformable actuators can separately be controlled. The amount of protrusion can thus be individually controlled for the write head element and the read head element. The flying height can individually be set above the surface of the recording medium for the write head element and the read head element. Such an adjustment of the flying height enables the write head element and the read head element to simultaneously get closest to the recording medium.

16 Claims, 6 Drawing Sheets

FLYING HEAD SLIDER AND RECORDING MEDIUM DRIVE

BACKGROUND OF THE INVENTION

1. Field of the Invention

The present invention relates to a flying head slider including a slider body defining a medium opposed surface and read and write head elements mounted on the slider body at the medium opposed surface of the slider body.

2. Description of the Prior Art

A resistive element is sometimes incorporated in a flying head slider in a recording disk drive such as a hard disk drive, HDD, as disclosed in Japanese Patent Application Publication No. 2004-259323. The resistive element is embedded within an insulating material along with a write head element and a read head element. The resistive element generates heat in response to the supply of electric current. The heat of the resistive element causes expansion of the insulating material adjacent to the resistive element. The write head element and the read head element are likewise caused to expand. This results in protrusion of the write head element and the read head element toward the surface of the magnetic recording disk. The write head element and the read head element are thus allowed to get closest to the surface of the magnetic recording disk.

The resistive element, the read head element and the write head element are layered in this sequence in the flying head slider. The insulating material expands in a smaller amount at a position remoter from the resistive element. While the read head element is allowed to sufficiently protrude toward the magnetic recording disk, the protrusion of the write head element is suppressed. The write head element cannot thus sufficiently approach the magnetic recording disk. Magnetization cannot be established in the magnetic recording disk at a sufficient intensity in response to a magnetic field of the write head element.

SUMMARY OF THE INVENTION

It is accordingly an object of the present invention to provide a flying head slider and a recording medium drive capable of allowing a write head element and a read head element to sufficiently approach a recording medium.

According to the present invention, there is provided a flying head slider comprising: a slider body defining a medium opposed surface; a write head element mounted on the slider body at the medium opposed surface of the slider body; a read head element mounted on the slider body at the medium opposed surface of the slider body; a first transformable actuator incorporated within the slider body at a position adjacent to the write head element, the first transformable actuator allowing the write head element to protrude toward a recording medium; and a second transformable actuator incorporated within the slider body at a position adjacent to the read head element, the second transformable actuator allowing the read head element to protrude toward the recording medium.

The first transformable actuator serves to protrude the write head element toward the recording medium in the flying head slider. The write head element thus serves to form a swell on the medium opposed surface. Likewise, the second transformable actuator serves to protrude the read head element toward the recording medium. The read head element thus serves to form a swell on the medium opposed surface. The first and second transformable actuators can separately be controlled. The amount of protrusion can thus be controlled individually for the write head element and the read head element. In other words, the flying height can individually be set above the surface of the recording medium for the write head element and the read head element. Such an adjustment of the flying height enables the write head element and the read head element to simultaneously get closest to the recording medium. The write head element is thus allowed to establish magnetization having a sufficient intensity in the recording medium. Simultaneously, the read head element is allowed to reliably read out magnetic bit data from the recording medium.

As described above, the flying height can individually be set above the surface of the recording medium for the write head element and the read head element. The flying head slider allows the write head element to enjoy the optimal flying height, while the read head element is also allowed to enjoy the optimal flying height. A conventional flying head slider enables protrusion of the read head element in a larger amount toward the recording medium, while the protrusion of the write head element is suppressed in the conventional flying head slider, as described above. If the write head element is allowed to enjoy the optimal flying height, the read head element gets excessively closer to the recording medium. The read head element tends to contact with or collide against the recording medium. The read head element and the recording medium suffer from damages.

The flying head slider may further comprise a third transformable actuator incorporated within the slider body at a position upstream of the write head element and the read head element. The third transformable actuator is allowed to transform to form a swell on the medium opposed surface. The third transformable actuator serves to form a swell on the medium opposed surface. A protuberance is in this manner formed at a position upstream of the read head element and the write head element. Even if the flying height of the flying head slider decreases, the protuberance is forced to contact with the recording medium before the contact of the write head element and the read head element. The flying head slider reacts to the contact for an increased flying height. The flying head slider thus gets distanced again from the recording medium. The write head element and/or the read head element can thus be prevented from contacting with or colliding against the recording medium. The write head element and/or the read head element is thus protected from damages.

If a thermal expansion is utilized in the second transformable actuator, a tunnel-junction magnetoresistive (TMR) element is preferably employed as the read head element. The tunnel-junction magnetoresistive element has a higher heat resistance than a giant magnetoresistive (GMR) element. The tunnel-junction magnetoresistive element can maintain an appropriate magnetic property even when the tunnel-junction magnetoresistive element is exposed to the heat of the second transformable actuator. A sufficient protrusion of the read head element can be realized. When the flying head slider is kept in an inclined attitude defined by a pitch angle relative to the surface of the recording medium, for example, a larger amount of the protrusion needs to be set for the read head element as compared with the write head element.

The flying head slider may further comprise: a pair of first lead wires extending from the first transformable actuator; a pair of second lead wires extending from the second transformable actuator; a first electrode terminal connected to one of the first lead wires; a second electrode terminal connected to one of the second lead wires; and a third electrode terminal connected to the other first lead wire and the other second lead wire. Since the third electrode terminal is formed in common for the first and second transformable actuators, the number of electrode terminals can be reduced in the flying head slider.

The flying head slider may be incorporated in a recording medium drive such as a hard disk drive, HDD. The recording medium drive may comprise: a recording medium; a slider body opposing a medium opposed surface to the recording medium; a write head element mounted on the slider body at the medium opposed surface of the slider body; a read head element mounted on the slider body at the medium opposed surface of the slider body; a first transformable actuator incorporated within the slider body at a position adjacent to the write head element, said first transformable actuator allowing the write head element to protrude toward the recording medium; and a second transformable actuator incorporated within the slider body at a position adjacent to the read head element, said second transformable actuator allowing the read head element to protrude toward the recording medium.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
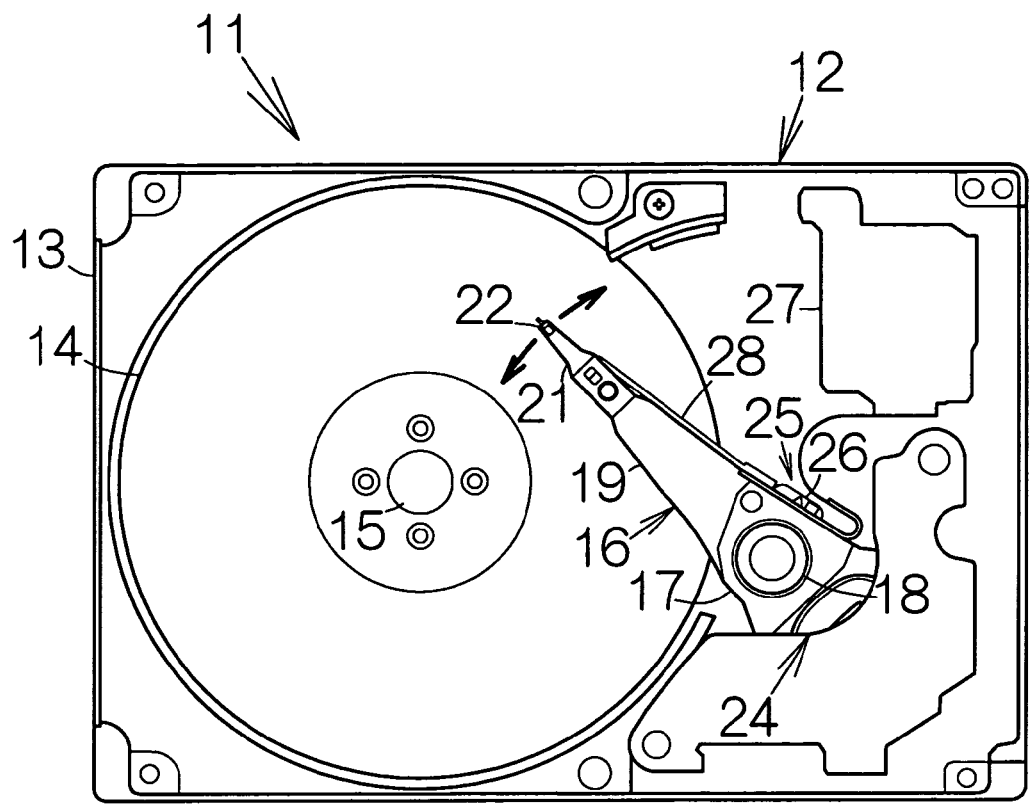
FIG. 1 is a plan view schematically illustrating the inner structure of a hard disk drive, HDD, as a specific example of a recording medium drive.

FIG. 1 schematically illustrates the inner structure of a hard disk drive, HDD, 11 as an example of a disk drive or storage device according to an embodiment of the present invention. The hard disk drive 11 includes a box-shaped enclosure 12. The enclosure 12 includes a boxed-shaped base 13 defining an inner space of a flat parallelepiped, for example. The base 13 may be made of a metallic material such as aluminum, for example. Molding process may be employed to form the base 13. A cover, not shown, is coupled to the base 13. The cover closes the opening of the inner space within the base 13. Pressing process may be employed to form the cover out of a plate material, for example.

At least one magnetic recording disk 14 as a recording medium is incorporated within the inner space of the base 13. The magnetic recording disk or disks 14 is mounted on the driving shaft of a spindle motor 15. The spindle motor 15 drives the magnetic recording disk or disks 14 at a higher revolution speed such as 5,400 rpm, 7,200 rpm, 10,000 rpm, 15,000 rpm, or the like.

A head actuator member, namely a carriage 16, is also incorporated within the inner space of the base 13. The carriage 16 includes a carriage block 17. The carriage block 17 is supported on a vertical support shaft 18 for relative rotation. Carriage arms 19 are defined in the carriage block 17. The carriage arms 19 are designed to extend in the horizontal direction from the support shaft 18. The carriage block 17 may be made of aluminum, for example. Extrusion molding process may be employed to form the carriage block 17.

An elastic head suspension 21 is fixed to the tip end of the individual carriage arm 19. The head suspension 21 is designed to extend forward from the tip end of the carriage arm 19. A gimbal spring, not shown, is connected to the tip end of the individual head suspension 21. A flying head slider 22 is fixed to the surface of the gimbal spring. The gimbal spring allows the flying head slider 22 to change its attitude relative to the head suspension 21. A read/write electromagnetic transducer is mounted on the individual flying head slider 22 as described later.

When the magnetic recording disk 14 rotates, the flying head slider 22 is allowed to receive an airflow generated along the rotating magnetic recording disk 14. The airflow serves to generate a positive pressure or a lift as well as a negative pressure on the flying head slider 22. The flying head slider 22 is thus allowed to keep flying above the surface of the rotating magnetic recording disk 14 at a higher stability established by the balance between the urging force of the head suspension 21 and the combination of the lift and the negative pressure.

When the carriage 16 is driven to swing around the support shaft 18 during the flight of the flying head slider 22, the flying head slider 22 is allowed to move in the radial direction of the magnetic recording disk 14. The read/write electromagnetic transducer on the flying head slider 22 is thus allowed to cross the data zone defined between the innermost and outermost recording tracks. The read/write electromagnetic transducer can thus be positioned right above a target recording track on the magnetic recording disk 14.

A power source such as a voice coil motor, VCM, 24 is connected to the carriage block 17. The voice coil motor 24 is designed to drive the carriage block 17 for rotation around the support shaft 18. The rotation of the carriage block 17 causes the swinging movement of the carriage arms 19 and the head suspensions 21.

As is apparent from FIG. 1, a flexible printed circuit board unit 25 is superimposed on the carriage block 17. A head IC (integrated circuit) or preamplifier IC 26 is mounted on the surface of the flexible printed circuit board 25. The preamplifier IC 26 is designed to supply the read element of the read/write electromagnetic transducer with a sensing current when magnetic bit data is to be read. The preamplifier IC 26 is also designed to supply the write element of the read/write electromagnetic transducer with a writing current when the magnetic bit data is to be written. A small-sized circuit board 27 is located within the inner space of the enclosure 12. The circuit board 27 is designed to supply the preamplifier IC 26 on the flexible printed circuit board unit 25 with a sensing and a writing current. A printed circuit board, not shown, may be coupled to the back of the bottom plate of the enclosure 12. The printed circuit board may also be designed to supply the preamplifier IC 26 on the flexible printed circuit board unit 25 with a sensing and a write current.

A flexible printed circuit board 28 is located on the individual flying head slider 22 for supplying the sensing and write currents. The flexible printed circuit board 28 includes a metallic thin plate, an insulating layer, an electrically-conductive layer, and a protecting layer. The metallic thin plate is made of stainless steel, for example. The insulating layer, the electrically-conductive layer and the protecting layer are layered on the metallic thin film in this sequence. The electrically-conductive layer includes a wiring pattern, not shown, extending on the flexible printed circuit board 28. The electrically-conductive layer may be made of an electrically-conductive material such as copper. The insulating layer and the protecting layer may be made of a resin material such as polyimide resin.

The wiring pattern on the flexible printed circuit board 28 is connected to the corresponding flying head slider 22. Adhesive may be utilized for attaching the flexible printed circuit board 28 onto the corresponding head suspension 21, for example. The flexible printed circuit board 28 is designed to extend backward from the head suspension 21 along the side surface of the carriage arm 19. The other end of the flexible printed circuit board 28 is coupled to the flexible printed circuit board unit 25. The wiring pattern on the flexible printed circuit board 28 is connected to a wiring pattern, not shown, on the flexible printed circuit board unit 25. The flying head slider 22 and the flexible printed circuit board unit 25 are in this manner electrically connected to each other.

Figure 2:
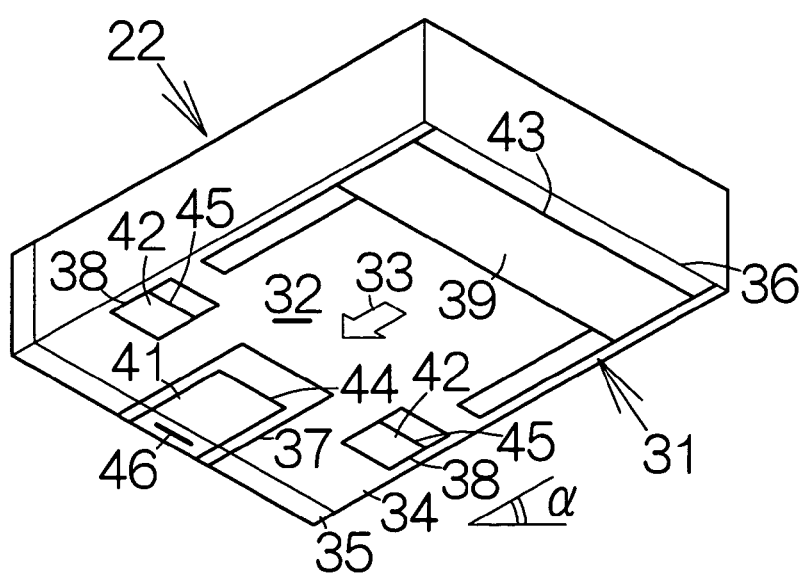
FIG. 2 is an enlarged perspective view of a flying head slider according to a specific example.

FIG. 2 illustrates a specific example of the flying head slider 22. The flying head slider 22 includes a slider body 31 of a flat parallelepiped, for example. The slider body 31 is opposed to the magnetic recording disk 14 at a medium opposed surface, namely a bottom surface 32. The bottom surface 32 defines a flat base surface or reference surface. When the magnetic recording disk 14 is driven to rotate, an airflow 33 flows from the front end to the rear end of the slider body 31 along the bottom surface 32. The slider body 31 may include a base material 34 made of $Al_2O_3$-Tic and a head protection film 35 made of $Al_2O_3$, for example. The head protection film 35 may be superimposed on the outflow or trailing end of the base material 34.

A front rail 36 is formed on the bottom surface 32 of the slider body 31. The front rail 36 stands upright from the flat base surface at a position near the upstream or inflow end of the slider body 31. The term "upstream" is defined in accordance with the direction of the airflow 33. A rear rail 37 is also formed on the bottom surface 32 of the slider body 31. The rear rail 37 stands upright from the flat base surface at a position near the downstream or outflow end of the slider body 31. The term "downstream" is likewise defined in accordance with the direction of the airflow 33. A pair of side rails 38, 38 is likewise formed on the bottom surface 32 of the slider body 31. The side rails 38, 38 stand upright from the flat base surface at positions near the outflow end. The top surfaces of these rails 36, 37, 38, 38 define so-called air bearing surfaces 39, 41, 42, 42, respectively. The inflow ends of the air bearing surfaces 39, 41, 42, 42 are coupled to the top surfaces of the rails 36, 37, 38, 38 through steps 43, 44, 45, 45, respectively.

The rotation of the magnetic recording disk 14 serves to induce the airflow 33 along the surface of the rotating magnetic recording disk 14. The bottom surface 32 receives the airflow 33. The steps 43, 44, 45 serve to generate a relatively large positive pressure or lift on the air bearing surfaces 39, 41, 42, respectively. A negative pressure is generated behind the front rail 36. The flying attitude of the flying head slider 22 is established based on the balance between the lift and the negative pressure.

The aforementioned read/write electromagnetic transducer 46 is mounted on the slider body 31. The read/write electromagnetic transducer 46 is embedded in the head protection film 35 of the slider body 31. A read gap and a write gap of the read/write electromagnetic transducer 46 are exposed at the air bearing surface 41 of the rear rail 37. A DLC (diamond-like-carbon) protecting film may be formed on the surface of the air bearing surface 41 to cover over the front end of the read/write electromagnetic transducer 46. A detailed description will be made on the read/write electromagnetic transducer 46 later. It should be noted that the flying head slider 22 may take any other shape or form different from the described one.

A larger positive pressure or lift is generated on the air bearing surface 39 as compared with the air bearing surfaces 41, 42 in the flying head slider 22. When the slider body 31 flies above the surface of the magnetic recording disk 14, the slider body 31 can be kept at an inclined attitude defined by a pitch angle $\alpha$. In this case, the pitch angle $\alpha$ means an inclined angle in the longitudinal direction of the slider body 31 along the direction of the airflow.

Figure 3:
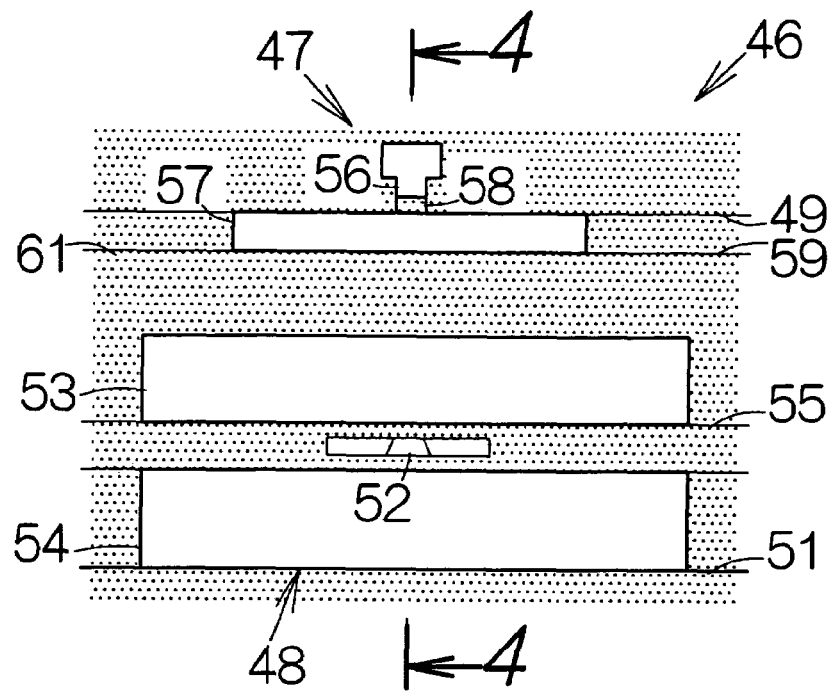
FIG. 3 is an enlarged front view of a read/write electromagnetic transducer observed at the medium-opposed surface, namely an air bearing surface of the flying head slider.

FIG. 3 illustrates the bottom surface 32 of the flying head slider 22 in detail. The read/write electromagnetic transducer 46 includes a thin film magnetic head or inductive write head element 47 and a read head element 48. As conventionally known, the inductive write head element 47 utilizes a magnetic field generated at a magnetic coil for writing bit data into the magnetic recording disk 14, for example. A magnetoresistive (MR) element such as a giant magnetoresistive (GMR) element, a tunnel-junction magnetoresistive (TMR) element, or the like, may be employed as the read head element 48. The read head element 48 is usually allowed to detect bit data based on variation in the electric resistance in response to the inversion of polarization in the magnetic field applied from the magnetic recording disk 14. The inductive write head element 47 and the read head element 48 are interposed between an $Al_2O_3$ overcoat film 49 and an $Al_2O_3$ undercoat film 51. The overcoat film 49 corresponds to the upper half of the aforementioned head protection film 35, while the undercoat film 51 corresponds to the lower half of the head protection film 35.

The read head element 48 includes a magnetoresistive film 52, such as a tunnel-junction film, interposed between a pair of electrically-conductive layers or upper and lower shield layers 53, 54. The magnetoresistive film 52 is embedded within an insulation layer 55 covering over the upper surface of the lower shield layer 54. The insulation layer 55 is made of $Al_2O_3$, for example. The upper shield layer 53 extends along the upper surface of the insulation layer 55. The upper and lower shield layers 53, 54 may be made of a magnetic material such as FeN, NiFe, or the like. A space between the upper and lower shield layers 53, 54 serves to determine a linear resolution of magnetic recordation on the magnetic recording disk 14 along the recording track.

The inductive write head element 47 includes an electrically-conductive layers or upper and lower magnetic pole layers 56, 57. The front ends of the upper and lower magnetic pole layers 56, 57 are exposed at the air bearing surface 39. The upper and lower magnetic pole layers 56, 57 may be made of a magnetic material such as FeN, NiFe, or the like. The upper and lower magnetic pole layers 56, 57 in combination establish a magnetic core of the inductive write head element 47. A non-magnetic gap layer 58 made of $Al_2O_3$ is interposed between the upper and lower magnetic pole layers 56, 57, for example. When a magnetic field is generated at a magnetic coil, magnetic flux runs between the upper and lower magnetic pole layers 56, 57. The non-magnetic gap layer 58 serves to leak the magnetic flux out of the bottom surface 32 in a conventional manner. The leaked magnetic flux forms a magnetic field for recordation.

Figure 4:
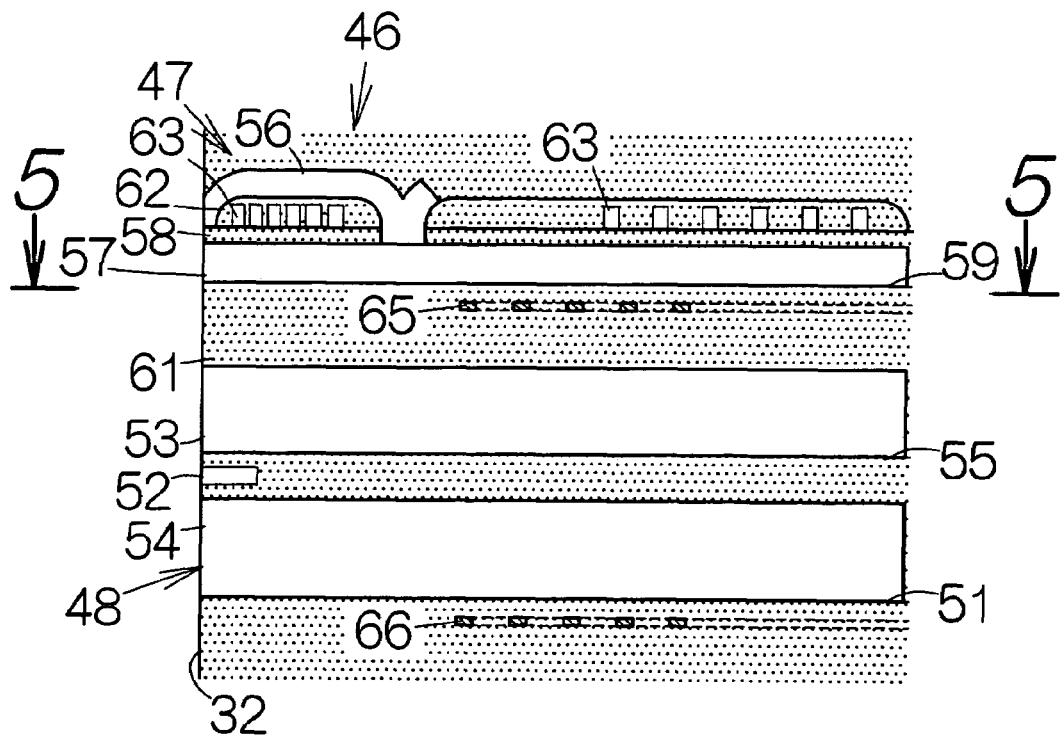
FIG. 4 is a sectional view taken along the line 4-4 in FIG. 3.

Referring also to FIG. 4, the lower magnetic pole layer 57 extends along a reference plane 59 over the upper shield layer 53. The reference plane 59 is defined on the surface of a non-magnetic layer 61 overlaid on the upper shield layer 53 by a constant thickness. The non-magnetic layer 61 is made of $Al_2O_3$, for example. The non-magnetic layer 61 serves to establish a magnetic isolation between the upper shield layer 53 and the lower magnetic pole layer 57.

The aforementioned non-magnetic gap layer 58 is overlaid on the lower magnetic pole layer 57. The aforementioned magnetic coil, namely a thin film coil pattern 63, is formed on the non-magnetic gap layer 58. The thin film coil 62 is embedded within an insulating layer 62. The aforementioned upper magnetic pole layer 56 is overlaid on the upper surface of the insulating layer 62. The rear end of the upper magnetic pole layer 56 is magnetically connected to the rear end of the lower magnetic pole layer 57 at the central area of the thin film coil pattern 63. The upper and lower magnetic pole layers 56, 57 in combination establish a magnetic core penetrating through the central area of the thin film coil pattern 63.

Figure 5:
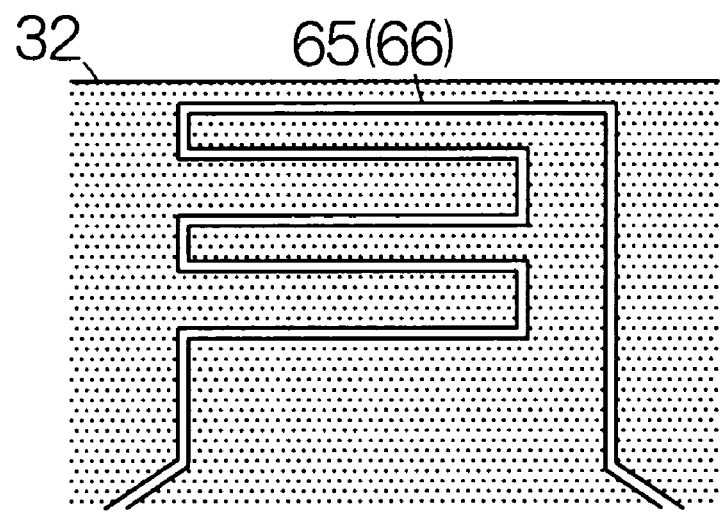
FIG. 5 is a sectional view taken along the line 5-5 in FIG. 4.

A first heating wire 65 is embedded within the non-magnetic layer 61. The first heating wire 65 is located adjacent to the inductive write head element 47 within the non-magnetic layer 61. Likewise, a second heating wire 66 is embedded within the undercoat film 51. The second heating wire 66 is located adjacent to the read head element 48 within the undercoat film 51. As shown in FIG. 5, the first heating wire 65 may serpentine along a plane within the non-magnetic layer 61, for example. Photolithography technology may be employed to form the first heating wire 65, for example. In this case, the non-magnetic layer 61 may include a pair of $Al_2O_3$ films holding the first heating wire 65 therebetween. The first heating wire 65 and the non-magnetic layer 61 in combination function as a transformable actuator according to the present invention. The second heating wire 66 may have a structure equivalent to that of the first heating wire 65. The second heating wire 66 and the undercoat film 51 in combination function as a transformable actuator according to the present invention.

Figure 6:
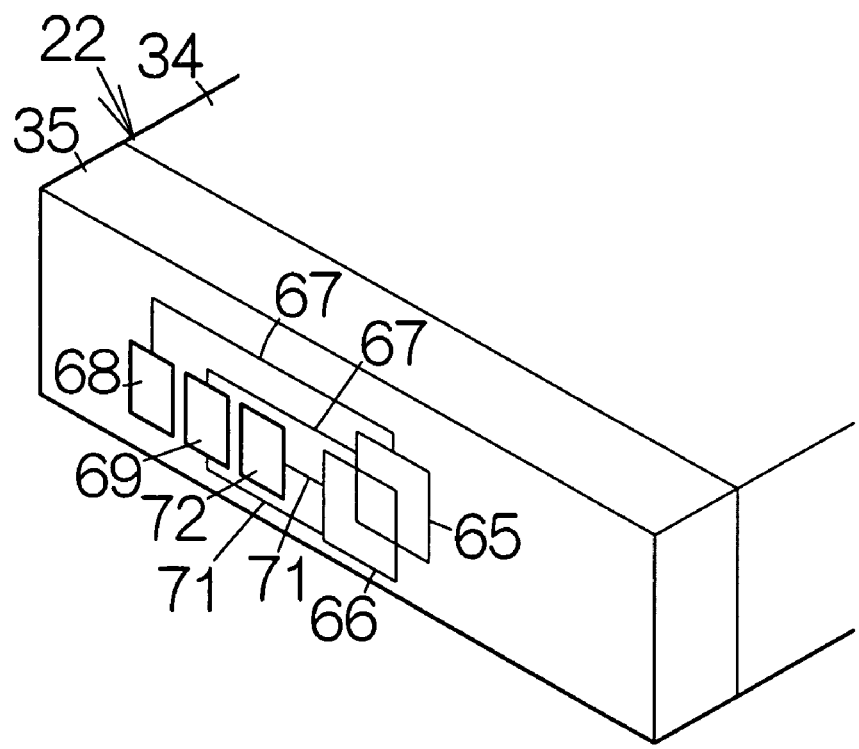
FIG. 6 is a partial enlarged perspective view of the flying head slider for schematically illustrating the structure of lead wires and terminals.

As shown in FIG. 6, a pair of first lead wires 67, 67 is connected to the first heating wire 65. One of the first lead wires 67 is connected to a first electrode terminal 68. The other first lead wire 67 is connected to a common electrode terminal 69. A pair of second lead wires 71, 71 is likewise connected to the second heating wire 66. One of the second lead wires 71 is connected to a second electrode terminal 72. The other second lead wire 71 is connected to the common electrode terminal 69. The common electrode terminal 69 is in this manner utilized for both the first and second heating wires 65, 66 in common. The number of terminals can thus be reduced in the flying head slider 22. The first and second electrode terminals 68, 72 and the common electrode terminal 69 may be located on the outflow end surface of the head protection film 35, for example.

A wiring pattern, not shown, on the flexible printed circuit board 28 is connected to the first and second electrode terminals 68, 72 and the common electrode terminal 69. Electric current is supplied to the first heating wire 65 from the first electrode terminal 68, for example. Electric current is also supplied to the second heating wire 66 from the second electrode terminal 72, for example. The electric currents are taken out through the common electrode terminal 69. The circulation of electric current causes the first and second heating wires 65, 66 to get heated. The calorific values of the first and second heating wires 65, 66 can individually be adjusted based on their electric consumption. Correlation may be sought between the electric consumption and the calorific value for the adjustment. A controller circuit mounted on the circuit board 27 may serve to realize the adjustment, for example.

Figure 7:
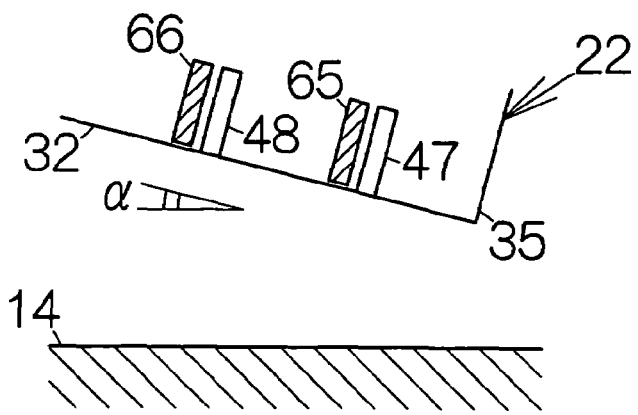
FIG. 7 is a schematic view of a flying head slider flying above the surface of a magnetic recording disk.

Now, assume that the flying head slider 22 keeps flying during the rotation of the magnetic recording disk 14. As shown in FIG. 7, the flying head slider 22 is kept in the inclined attitude defined by the pitch angle $\alpha$. The flying head slider 22 locate the outflow end closest to the surface of the magnetic recording disk 14. The read head element 48 is located at a position upstream of the inductive write head element 47 in the flying head slider 22. The flying height of the read head element 48 is thus set larger than that of the inductive write head element 47 based on the pitch angle $\alpha$.

Figure 8:
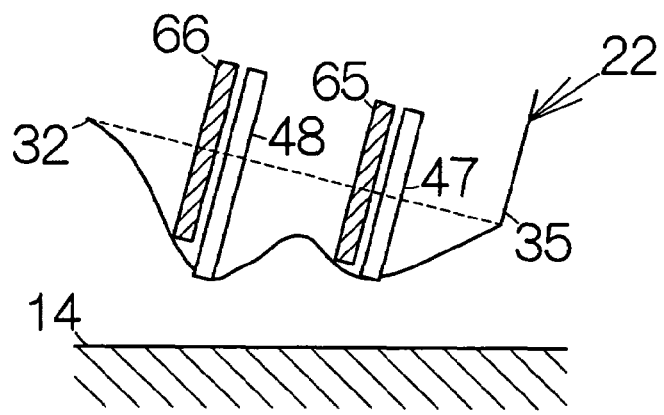
FIG. 8 is a schematic view of a flying head slider flying above the surface of a magnetic recording disk.

Electric current is supplied to the first heating wire 65 when magnetic bit data is to be read or written. The first heating wire 65 gets heated in response to the supply of electric current. The first heating wire 65 is caused to expand. The heat simultaneously causes expansion of the non-magnetic layer 61 around the first heating wire 65. The inductive write head element 47 is correspondingly forced to protrude toward the magnetic recording disk 14, as shown in FIG. 8. The inductive write head element 47 serves to form a swell on the air bearing surface 42. Likewise, electric current is supplied to the second heating wire 66. The second heating wire 66 gets heated in response to the supply of electric current. The second heating wire 66 is thus caused to expand. The heat simultaneously causes expansion of the undercoat film 51 around the second heating wire 66. The read head element 48 is correspondingly forced to protrude toward the magnetic recording disk 14. The read head element 48 serves to from a swell on the air bearing surface 42.

The current value can be set separately for each of the first and second heating wires 65, 66 in the flying head slider 22. The amount of protrusion can thus be controlled for each of the inductive write head element 47 and the read head element 48. The flying height can also be set for each of the inductive write head element 47 and the read head element 48. The adjustment of the individual flying height allows the inductive write head element 47 and the read head element 48 to simultaneously get closest to the surface of the magnetic recording disk 14.

The flying head slider 22 allows the inductive write head element 47 to enjoy the optimal flying height, while the read head element 48 is also allowed to enjoy the optimal flying height. The optimal flying height of the inductive write head element 47 may be different from that of the read head element 48. The flying heights of the inductive write head element 47 and the read head element 48 may be adjusted in response to a reduction in the atmospheric pressure since the reduction in the atmospheric pressure induces a reduction in the pitch angle $\alpha$. In the case where a change in the environmental temperature of the hard disk drive 11 causes a difference in the amount of deformation between the inductive write head element 47 and the read head element 48, the amount of protrusion may individually be adjusted depending on the difference in deformation. The amount of protrusion may individually be adjusted for the flying head sliders 22 depending on the flying heights intrinsic to the flying head sliders 22.

Employment of a tunnel-junction magnetoresistive (TMR) element is expected for the flying head slider 22. The tunnel-junction magnetoresistive element has a higher heat resistance than a giant magnetoresistive (GMR) element. The tunnel-junction magnetoresistive element can maintain an appropriate magnetic property even when the tunnel-junction magnetoresistive element is exposed to the heat of the second heating wire 66. A sufficient protrusion of the read head element 48 can be realized. When the flying head slider 22 is kept at the inclined attitude defined by the pitch angle α as described above, a larger amount of the protrusion needs to be set for the read head element 48 as compared with the inductive write head element 47.

Figure 9:
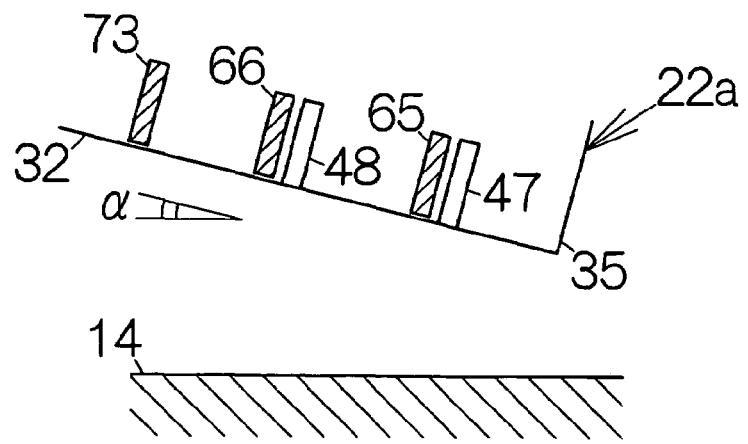
FIG. 9 is a schematic view of a flying head slider flying above the surface of a magnetic recording disk according to another specific example.

A flying head slider 22*a* may further include a third heating wire 73, as shown in FIG. 9. The third heating wire 73 is located in front of the second heating wire 66 at a position upstream of the second heating wire 66. The third heating wire 73 may be embedded within the undercoat film 51. The third heating wire 73 may have structure equivalent to those of the first and second heating wires 65, 66. Here, the third heating wire 73 and the undercoat film 51 in combination function as a transformable actuator according to the present invention. Like reference numerals are attached to structure or components equivalent to those of the aforementioned embodiment.

Figure 10:
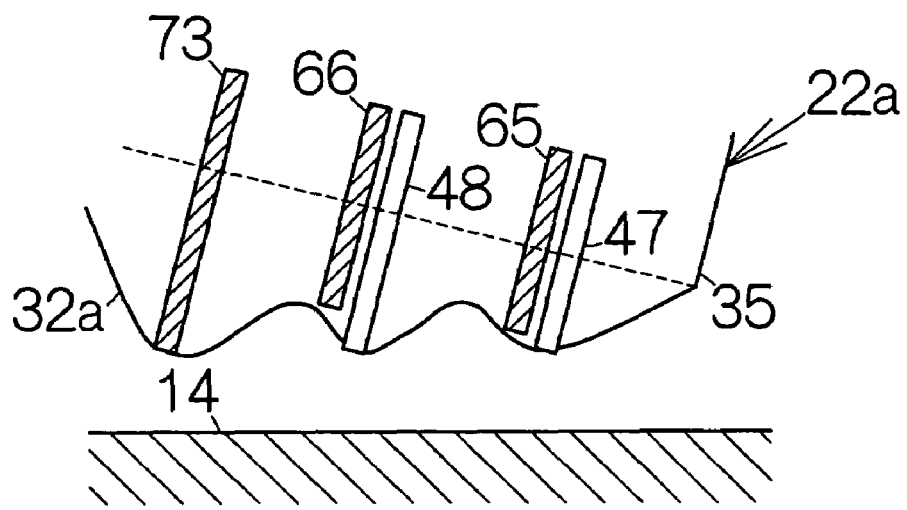
FIG. 10 is a schematic view of a flying head slider flying above the surface of a magnetic recording disk.

The third heating wire 73 gets heated in response to the supply of electric current in the flying head slider 22*a*. The third heating wire 73 is then caused to expand. The heat is simultaneously applied to the undercoat film 51 adjacent to the third heating wire 73. The undercoat film 51 is thus simultaneously causes to expand around the third heating wire 73. As shown in FIG. 10, the undercoat film 51 thus provides a protuberance 32*a* on the air bearing surface 42. The protuberance 32*a* protrudes toward the surface of the magnetic recording disk 14.

The flying height of the protuberance 32*a* may be set smaller than those of the inductive write head element 47 and the read head element 48. Even if the flying height of the flying head slider 22 decreases, the protuberance 32*a* is forced to contact with the surface of the magnetic recording disk 14 before the contact of the inductive write head element 47 and the read head element 48. The flying head slider 22 reacts to the contact for an increased flying height. The inductive write head element 47 and/or the read head element 48 can thus be prevented from contacting with or colliding against the surface of the magnetic recording disk 14. The inductive write head element 47 and/or the read head element 48 is thus protected from damages. Moreover, even when a reduction in the atmospheric pressure causes a reduction in the pitch angle α, the height of the protuberance 32*a* may be adjusted in response to the reduced amount of the pitch angle α.

Figure 11:
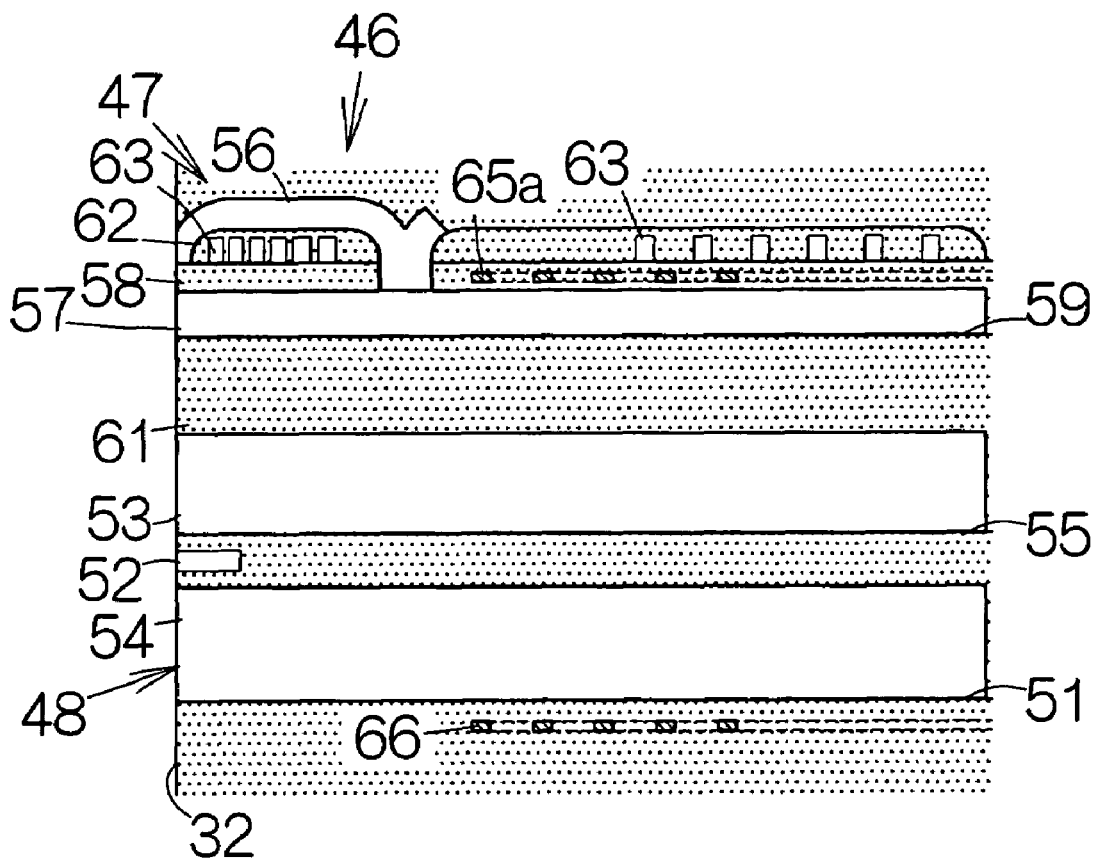
FIG. 11 is a sectional view, corresponding to FIG. 4, of a flying head slider according to still another specific example.
Figure 12:
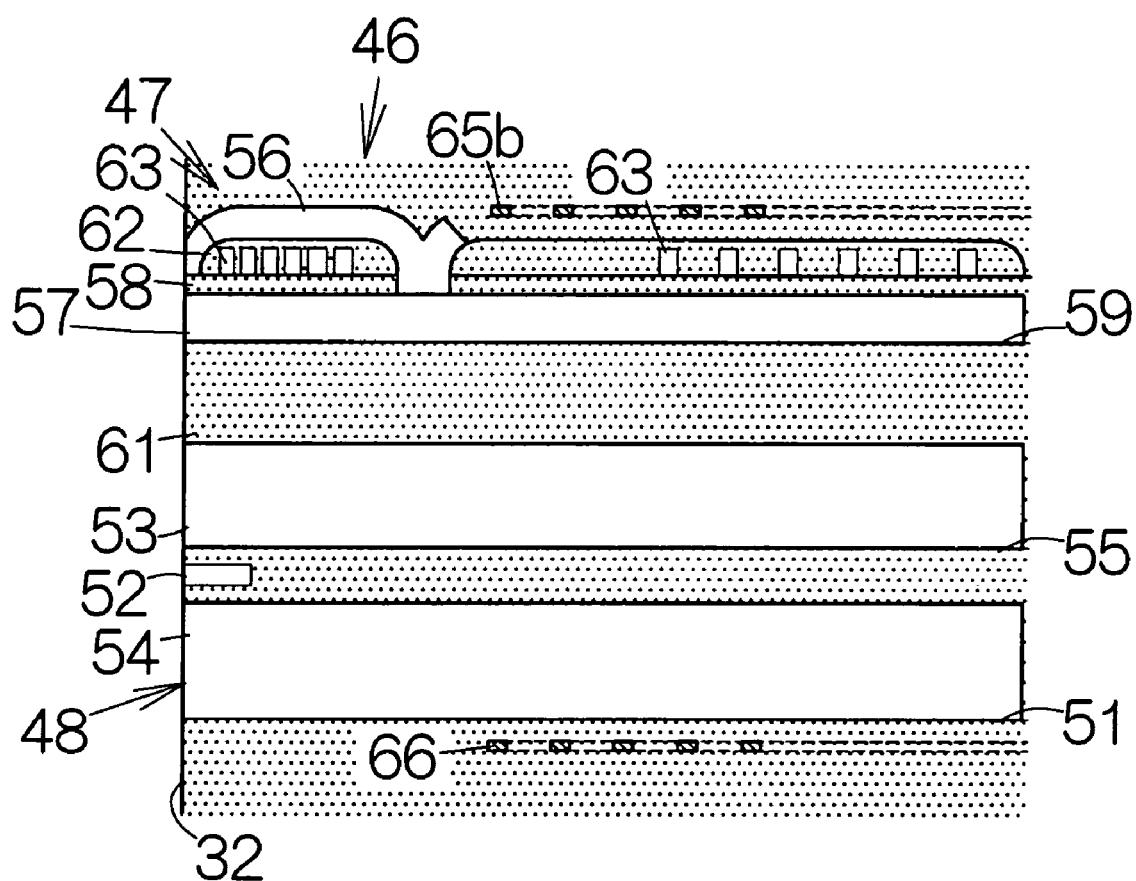
FIG. 12 is a sectional view, corresponding to FIG. 4, of a flying head slider according to still another specific example.

As shown in FIG. 11, the aforementioned first heating wire 65 may be replaced with a first heating wire 65*a* in the flying head slider 22, 22*a*. The first heating wire 65*a* may be embedded within the non-magnetic gap layer 58 between the thin film coil pattern 63 and the lower magnetic pole layer 57. Alternatively, a first, heating wire 65*b* may be incorporated in the flying head slider 22, 22*a*, in place of the first heating wire 65*a*, as shown in FIG. 12. The first heating wire 65*b* may be embedded within the overcoat film 49 at a position upstream of the inductive write head element 47. The first heating wires 65*a*, 65*b* can function identically to the aforementioned first heating wire 65.

It should be noted that a piezoelectric actuator or an electrostatic actuator may be employed as the aforementioned transformable actuator or actuators. A piezoelectric element may be interposed between a pair of electrodes for establishment of the piezoelectric actuator, for example. Such transformable actuators are allowed to shrink and elongate in response to the supply of electric current to the electrodes.

What is claimed is:

1. A flying head slider comprising:
   a slider body having a medium opposed surface that is arranged opposite to a recording medium;
   a write head element mounted on the slider body, the write head element including a magnetic pole layer extending rearward from a front end, located at the medium opposed surface, along a first plane intersecting the medium opposed surface;
   a read head element mounted on the slider body at the medium opposed surface of the slider body, the read head element including a shield layer extending along a second plane intersecting the medium opposed surface;
   a first heating element incorporated within the slider body, the first heating element extending rearward from a front end along a plane parallel to the first plane at a position adjacent to the write head element, the front end of the first heating element located forward of a rear end of the magnetic pole layer;
   a second heating element incorporated within the slider body, the second heating element extending along a plane parallel to the second plane at a position adjacent to the read head element; and
   a transformable actuator incorporated within the slider body at a position upstream of the write and read head elements, the transformable actuator transforming to form a swell on the medium opposed surface.

2. The flying head slider according to claim 1, wherein a tunnel-junction magnetoresistive element is employed as the read head element.

3. The flying head slider according to claim 1, further comprising:
   a pair of first lead wires extending from the first heating element;
   a pair of second lead wires extending from the second heating element;
   a first electrode terminal connected to one of the first lead wires;
   a second electrode terminal connected to one of the second lead wires; and
   a third electrode terminal connected to the other of the first lead wires and the other of the second lead wires.

4. The flying head slider according to claim 1, wherein
   the shield layer extends rearward from a front end, located at the medium opposed surface, along the second plane; and
   the second heating element extends rearward from a front end along the plane parallel to the second plane, the front end of the second heating element located forward of a rear end of the shield layer.

5. The flying head slider according to claim 1, wherein the first heating element is located between the write head element and the read head element.

6. The flying head slider according to claim 1, wherein the first heating element is located within the write head element.

7. The flying head slider according to claim 1, wherein the first heating element is located at a position downstream of the write and read head element.

8. The flying head slider according to claim 1, wherein the second heating element is located between the read element and the transformable actuator.

9. A recording medium drive comprising:
   a recording medium;

a slider body having a medium opposed surface to oppose a surface of the recording medium;

a write head element mounted on the slider body, the write head element including a magnetic pole layer extending rearward from a front end, located at the medium opposed surface, along a first plane intersecting the medium opposed surface;

a read head element mounted on the slider body at the medium opposed surface of the slider body, the read head element including a shield layer extending along a second plane intersecting the medium opposed surface;

a first heating element incorporated within the slider body, the first heating element extending rearward from a front end along a plane parallel to the first plane at a position adjacent to the write head element, the front end of the first heating element located forward of a rear end of the magnetic pole layer;

a second heating element incorporated within the slider body, the second heating element extending along a plane parallel to the second plane at a position adjacent to the read head; and a transformable actuator incorporated within the slider body at a position upstream of the write and read head elements, the transformable actuator transforming to form a swell on the medium opposed surface.

10. The recording medium drive according to claim 9, wherein a tunnel-junction magnetoresistive element is employed as the read head element.

11. The recording medium drive according to claim 9, further comprising:

a pair of first lead wires extending from the first heating element;

a pair of second lead wires extending from the second heating element;

a first electrode terminal connected to one of the first lead wires;

a second electrode terminal connected to one of the second lead wires; and a third electrode terminal connected to other of the first lead wires and other of the second lead wires.

12. The recording medium drive according to claim 9, wherein the shield layer extends rearward from a front end, located at the medium opposed surface, along the second plane; and the second heating element extends rearward from a front end along the plane parallel to the second plane, the front end of the second heating element located forward of a rear end of the shield layer.

13. The recording medium drive according to claim 9, wherein the first heating element is located between the write head element and the read head element.

14. The recording medium drive according to claim 9, wherein the first heating element is located within the write head element.

15. The recording medium drive according to claim 9, wherein the first heating element is located at a position downstream of the write and read head element.

16. The recording medium drive according to claim 9, wherein the second heating element is located between the read element and the transformable actuator.

* * * * *